Figure 3:
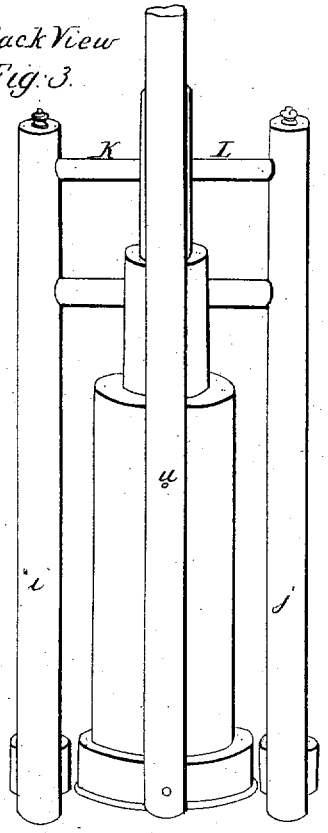
Figure 1:
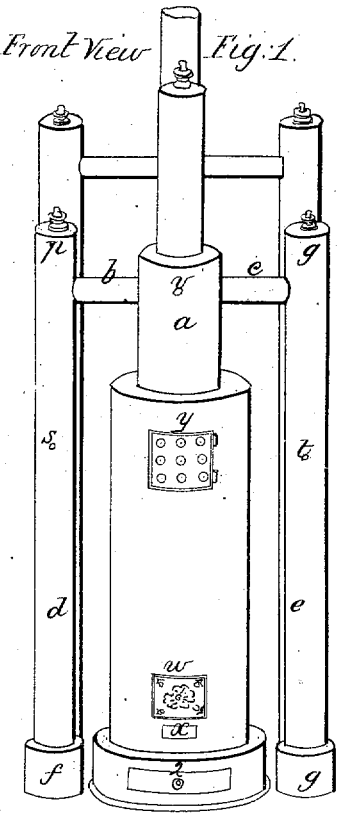
Figure 2:
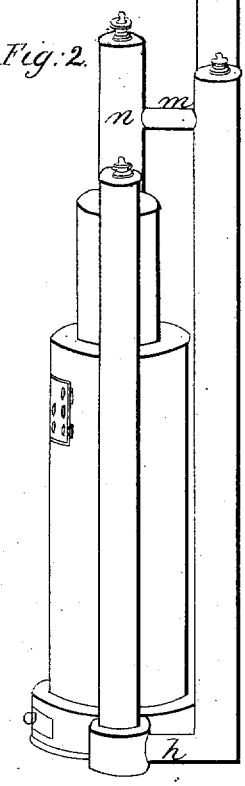
Figure 5:
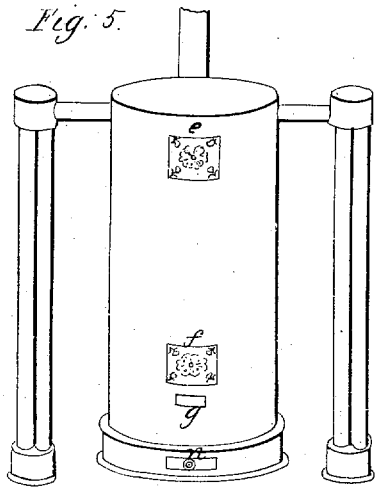
Figure 4:
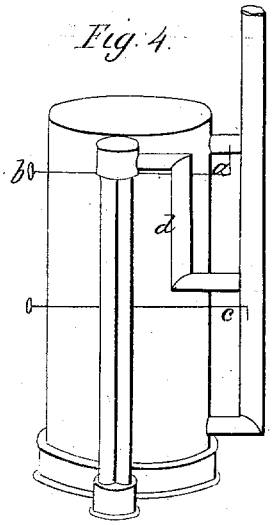

8155X

J. Atwater.

Heating Stove.

Patented Apr. 19, 1834.

Back View

Front View

Side View

N. PETERS, PHOTO-LITHOGRAPHER, WASHINGTON, D. C.

James Atwater
Letters Patent

The Schedule referred to in these Letters Patent and making part of the same containing a description in the words of the said James Atwater himself of his improvement in the common furnace stove.

To all people to whom these presents shall come. Know yee that I James Atwater of New Haven in the County of New Haven & State of Connecticut a Citizen of the United States have invented made & applied to use a new & usefull improvement in the common furnace stove which I describe and specify as follows. In the top or head of the stove Fig I. a. at about one third of its height I insert two pipes b. c. at right angles to the head & projecting laterally outward from the centre thereof a short distance then I turn these two pipes perpendicularly downward parallel to the body of the stove and continue each of them d, e, down to a base or drum f. g. standing on a level or nearly so with the bottom of the stove then I insert in each of these bases a pipe Figure II. h. at right angles or nearly so projecting toward the rear of the stove horizontally a short distance & then these pipes figure III. i. j. are turned perpendicularly upward & continued to nearly the height of the head of the stove then these pipes are turned at right angles laterally & horizontally inward toward each k. l. & inserted in a pipe of a large size round or square Figure III. m which passes toward the front horizontally till it reaches & is inserted in the head of the stove Figure II n. also in the rear of the stove below the grate & at as low a point above the dust pan Fig. I. z. as is convenient. I insert a pipe Figure III. a projecting horizontally a short distance from the stove & then turning upward Figure III o, & parallel to the stove till it meets & is inserted in the same pipe Figure II m, in which the two last mentioned pipes terminates. All these pipes should be placed so near the stove as not to occupy too much space but may be regulated as to distance from the stove by convenience. The perpendicular pipes Figure x Drawing 1. d, e, may be continued upward above their respective upper lateral pipes if desired & terminated Figure I p, q, with some ornament corres-ponding in height & appearance with the head of the stove as may please the fancy of the maker or owner. In the head of the stove above the part of the same whence the two first or two lower lateral pipes proceed & be-low the place where the pipe which proceeds from the two second or up-per lateral pipes enters the head, I place a valve Figure I. v, revolving on a pin or swivel so that it may be turned & close up the draught or open the same into the head of the stove at pleasure; In each of the two front perpendicular pipes I place a similar valve s, t, which closes or opens them at pleasure & is placed at any convenient height from the bottom of the stove. In the pipe which is inserted near the bottom of the stove or below the grate & proceeds upward in the rear of the stove as already described, I place a similar valve Figure III u, which op-ens or closes this pipe at pleasure. In the pipe which enters the head of the stove from the rear & in which the rear pipe & the two other lateral pipes terminate as before described I place a pipe Figure I, z, (or two pipes) which proceeds in any proper direction to conduct off smoke gas &c. All the pipes should be proportioned to the size of the stove in the usual manner. The best material for the construction of the stove & pipes is good sheet or cast iron & a lining of soap stone or fire brick with the bars for the grate somewhat nearer together than those used in com-mon grates. The doors & ash draw are made in the usual manner. The doors may be ornamented with isinglass when required. The ob-ject sought to be gained by this combination & arrangement are to economize & diffuse the heat & govern the draught of the stove & prevent the escape of dust when cleaning the same. These things are done as follows. When the valve in the head of the stove Figure I v. is open & all the others Figure I, s, t, Figure III, u, are shut the stove has the strong & direct draught of a simple furnace stove. When the valve in the head of the stove Figure I. v. is closed & those in the front side pipes Fig I, s, t, are open then the heated air passes from the head into these last mentioned pipes down thro' them into the drums & thence into the rear side pipes & upward thro' them & finally into the
pipe which leads off into the chimney or flue or some other part of the
building. If one of the valves in the side pipes Figure I. s. t. is open &
the other shut. the heated air will then be confined to the side on which
the open valve is found. If the valve in the rear pipe Figure III. u.
is open & all the others shut & also the lower doors Figure I. w. x. & pan z,
leaving only the upper door open Figure I. y. then the draught is down-
ward thro' the fuel into the back pipe and upward thro' that pipe
only & off as before. And if all the doors Figure I. w. x. y. are open &
valves as last mentioned the only draught is still thro' the back
pipe. Should the draught for carrying off the dust and causing the
fire to burn downwards not be required, the last described or back
pipe may then be omitted. If the improvement for the retention &
diffusion of the heat should not be required then the side pipes may
be omitted or one side pipe only with its valve be retained.
When the stove is to be placed in a fire place some change in its
structure will be required to fit it for that object. The head may
be shortened as seen in Figure IV. & the valve placed in a pipe Fig-
ure IV. a, & closed or opened with a rod or handle Figure IV b, com-
ing to the front of the stove. The valve also in the back pipe Figure
IV. c. will need to be opened and shut with a similar rod & both
rods must be connected with the pivot of the valve by means of a
knee or lever so that the rods will open or shut the valve by moving
backward & forward. The valves in the side pipes Figure V must
be placed as before described & as seen in Figure I. s. t. A slight
change is also requisite in the communication of the side pipes with
the pipe which leads from the stove and conducts away the smoke, gas &c.
This change is seen in Figure IV. d. Figure V. exhibits a front
view of such a fire place stove with its doors e, f, g, & pan h, this
will be sufficiently understood without further description. The only
object in exhibiting this form of the improvement is to show how
the invention while it retains the whole principle which I claim
can be accommodated to the place in which the instrument is to be used

7 used. I claim as my improvement the arrangement, combination, adaptation & adjustment of the several pipes & valves herein before described & specified so that by means thereof the draught of the stove is at pleasure either upward & direct thro' the fuel as in the common furnace stove or upward thro the fuel & in direct & circuitous thro' a pipe or series of pipes near the body of the stove or downwards thro' the fuel & a rear pipe & in either case ultimately off in the usual manner. I claim also the right to make use & vend stoves with any two of said draughts in combination that is to say with said upward & direct draught combined with the said upward & indirect draught thro' a side pipe or pipes as above described & without the downward draught aforesaid thro' the fuel & passing off thro' a rear pipe. And also the said upward & direct draught in combination with the downward draught thro' the fuel & passing off thro' the rear pipe as above described & without the upward & indirect draught aforesaid thro' the fuel & the side pipe or pipes. And also the said upward & indirect draught thro' the fuel & a side pipe or pipes in combination with the downward draught thro' the fuel & passing off thro' a rear pipe as above described without the said upward & direct draught. And I claim no particular part of the instrument separately taken but only so much of the apparatus in combination as accomplishes the combination of the various draughts (2, or,) either the combination of the whole of the three draughts or of any two of the same. And I make a separate claim for each of the above specified combinations. In testimony that the foregoing is a true, full, & exact description of the construction & operation of said machine as invented & improved by me. I have hereunto set my hand this 13th day of March A.D. 1834

Witnesses

[illegible] [illegible]

C. [illegible]

James Atwater

1722 [illegible]